US010721869B2

(12) United States Patent
Duquesne et al.

(10) Patent No.: US 10,721,869 B2
(45) Date of Patent: Jul. 28, 2020

(54) AGRICULTURAL HARVESTER WITH LATERALLY MOVING GRAIN PAN

(71) Applicant: CNH Industrial America LLC, New Holland, PA (US)

(72) Inventors: Frank R. G. Duquesne, Zwevegem (BE); Jonathan E. Ricketts, Coal Valley, IL (US); Herbert M. Farley, Elizabethtown, PA (US); Curtis F. Hillen, Lititz, PA (US); Bart Derynck, Aartrijke (BE); Daniel Turner, Villa Park, IL (US); Karl Linde, Leola, PA (US)

(73) Assignee: CNH Industrial America LLC, New Holland, PA (US)

( * ) Notice: Subject to any disclaimer, the term of this patent is extended or adjusted under 35 U.S.C. 154(b) by 193 days.

(21) Appl. No.: 15/756,148

(22) PCT Filed: Aug. 26, 2016

(86) PCT No.: PCT/US2016/048902
§ 371 (c)(1),
(2) Date: Feb. 28, 2018

(87) PCT Pub. No.: WO2017/040252
PCT Pub. Date: Mar. 9, 2017

(65) Prior Publication Data
US 2018/0279557 A1 Oct. 4, 2018

Related U.S. Application Data

(60) Provisional application No. 62/211,372, filed on Aug. 28, 2015.

(51) Int. Cl.
*A01F 12/44* (2006.01)
*A01D 41/127* (2006.01)
*A01D 75/28* (2006.01)

(52) U.S. Cl.
CPC ........ *A01F 12/446* (2013.01); *A01D 41/1276* (2013.01); *A01D 75/282* (2013.01)

(58) Field of Classification Search
CPC ........ A01F 12/446; A01F 12/44; A01F 12/32; A01F 12/38; A01F 12/56; A01D 41/1276; A01D 75/282; B07B 1/42
See application file for complete search history.

(56) References Cited

U.S. PATENT DOCUMENTS 1,689,314 A 10/1928 Worthington
3,109,434 A 11/1963 Strever
(Continued)

FOREIGN PATENT DOCUMENTS

EP 1595435 A1 11/2005
EP 2008507 A1 12/2008
WO 2015004268 A1 1/2015

*Primary Examiner* — Arpad Fabian-Kovacs
(74) *Attorney, Agent, or Firm* — Peter Zacharias; Patrick Sheldrake

(57) ABSTRACT

An agricultural harvester includes a chassis; a threshing and separating system carried by the chassis and including at least one threshing rotor mounted in a longitudinal direction of the agricultural harvester; a grain pan carried by the chassis that receives crop material from the threshing and separating system, the grain pan being configured to shake in a fore-to-aft direction and a lateral direction; and a cleaning system carried by the chassis supplied with crop material from the grain pan, the cleaning system including at least one sieve configured to shake in the lateral direction out of phase with the grain pan.

16 Claims, 13 Drawing Sheets

(56) References Cited

U.S. PATENT DOCUMENTS

| | | | |
|---|---|---|---|
| 3,757,797 A | 9/1973 | Mathews | |
| 4,307,732 A * | 12/1981 | De Busscher | A01F 12/444 209/318 |
| 4,344,443 A * | 8/1982 | De Busscher | A01D 75/282 460/150 |
| 4,355,647 A * | 10/1982 | Heidjann | A01D 75/282 460/101 |
| 4,598,718 A * | 7/1986 | Glaubitz | A01D 75/282 209/416 |
| 4,751,932 A * | 6/1988 | Busboom | A01D 75/282 460/9 |
| 4,770,190 A * | 9/1988 | Barnett | A01F 12/446 209/394 |
| 4,846,198 A | 7/1989 | Carnewal et al. | |
| 4,863,415 A * | 9/1989 | Carnewal | A01F 12/44 460/101 |
| 5,466,190 A * | 11/1995 | Skinner | A01F 12/44 460/101 |
| 5,529,537 A * | 6/1996 | Johnson | A01D 41/1275 460/119 |
| 6,119,442 A * | 9/2000 | Hale | A01D 41/1277 56/10.2 H |
| 7,322,882 B2 | 1/2008 | Duquesne et al. | |
| 7,473,170 B2 | 1/2009 | McKee et al. | |
| 7,553,226 B2 | 6/2009 | Dhont et al. | |
| 7,927,199 B2 * | 4/2011 | Adamson | A01D 75/282 460/101 |
| 8,939,829 B2 * | 1/2015 | Murray | A01F 12/448 460/101 |
| 9,814,184 B2 * | 11/2017 | Ricketts | A01D 75/282 |
| 2004/0023704 A1 * | 2/2004 | Grywacheski | A01F 12/444 460/99 |
| 2005/0282601 A1 * | 12/2005 | Duquesne | A01D 75/282 460/101 |
| 2006/0229119 A1 | 10/2006 | Wamhof et al. | |
| 2008/0318650 A1 * | 12/2008 | Dhont | A01D 75/282 460/101 |
| 2013/0029734 A1 * | 1/2013 | Behnke | A01D 41/1276 460/101 |
| 2013/0172057 A1 * | 7/2013 | Farley | A01D 75/282 460/5 |
| 2014/0171163 A1 | 6/2014 | Murray et al. | |
| 2015/0305243 A1 * | 10/2015 | Duquesne | A01F 12/446 460/101 |
| 2015/0342119 A1 * | 12/2015 | Duquesne | A01F 12/38 700/280 |
| 2016/0029562 A1 * | 2/2016 | De Smet | A01F 12/32 460/1 |
| 2016/0192591 A1 * | 7/2016 | Missotten | A01F 12/444 460/100 |
| 2016/0198629 A1 * | 7/2016 | Duquesne | A01D 41/1276 701/36 |
| 2016/0345500 A1 * | 12/2016 | Duquesne | A01F 12/444 |
| 2017/0086380 A1 * | 3/2017 | Walter | A01D 41/12 |
| 2017/0150680 A1 * | 6/2017 | Moutton | A01F 12/44 |

\* cited by examiner

AGRICULTURAL HARVESTER WITH LATERALLY MOVING GRAIN PAN

BACKGROUND OF THE INVENTION

1. Field of the Invention

The present invention relates to agricultural harvesters, and, more particularly, to cleaning systems of agricultural harvesters.

2. Description of the Related Art

Combines are used to harvest agricultural crops such as corn, soybeans, wheat and other grain crops. As the combine is driven through crop fields, the combine cuts the crop, separates the desired crop from the undesired waste, stores the crop, and discards the waste.

In a typical combine, a header is mounted to the front of the combine to gather the crop and feed the crop into the combine for processing. As the combine is driven through the field, the crop material is collected by the header and deposited into a feeder housing. The crop material is then transported upwardly and into the combine by a feed elevator located within the feeder housing. The crop material then passes through a threshing and separating mechanism. In a rotary combine, the threshing and separating mechanism includes a rotor, a threshing concave, a rotor cage, and a separating grate. As crop material passes between the rotor, the threshing concave and the separating grate, the crop material is impacted and/or rubbed, thereby causing the grain to separate from the stalk material. The stalk material that is separated from the grain is commonly referred to as material other than grain (MOG). Other types of combines are also known that perform similar functions using different mechanisms.

After passing through the threshing and separating assembly, the crop material is deposited onto a grain pan which transports the crop material to a grain cleaning system. The grain cleaning system of a typical combine includes a plurality of adjustable cleaning sieves, often referred to as a chaffer sieve and a shoe sieve. The sieves are typically reciprocated back and forth in opposite directions along an arcuate path. This motion has the tendency to separate the grain from the MOG. To further separate the grain from the MOG, a cleaning fan or blower is positioned so as to blow air up through the cleaning sieves. This flow of air tends to blow the MOG, which is typically lighter than grain, rearwardly and out the back of the combine. Grain, which is heavier than MOG, is allowed to drop through the openings in the sieve.

The clean grain that falls through the cleaning sieves is deposited on a collection panel positioned beneath the cleaning sieves. The collection panel is angled so as to permit the grain to flow, under the influence of gravity, into an auger trough positioned along the lowermost edge of the collection panel. The auger trough is typically positioned near the forward end of the cleaning sieves and extends along the width of the sieves. The grain collected in the auger trough is then moved by an auger towards the side of the combine where it is raised by a grain elevator and deposited into a storage tank or grain tank. Other systems also exist that can utilize, for example, a loop conveyor system which eliminates the need for a conventional cross auger.

The grain pan that supplies crop material that has passed through the threshing and separating assembly to the cleaning system typically shakes back and forth in a fore-to-aft direction to convey the crop material toward the cleaning system. As the grain pan shakes, the crop material distributes across the grain pan as it is conveyed toward the cleaning system. The cleaning system performance is dependent on the delivery of an even or symmetric distribution of crop material to the cleaning system. To better control the distribution of crop material to the cleaning system, dividers on the grain pan and other mechanisms have been employed to try to make the crop material distribution to the cleaning system as uniform as possible. However, the agricultural harvester can operate in conditions that frustrate the ability to control the crop material distribution to the cleaning system, such as harvesting on a side slope or uneven delivery of crop material from the threshing and separating assembly due to crop conditions, machine settings, wear or otherwise. When the crop material distribution to the cleaning system is uneven, the efficiency of the cleaning system suffers due to the surface area of the cleaning system not being optimally utilized.

What is needed in the art is a way to provide an even crop material distribution to the cleaning system that overcomes some of the previously described disadvantages.

SUMMARY OF THE INVENTION

The present invention provides a grain pan that can shake in a fore-to-aft direction and a lateral direction and supplies crop material from a threshing and separating system to a cleaning system with at least one sieve that can shake in the lateral direction out of phase with the grain pan.

The invention in one form is directed to an agricultural harvester including: a chassis; a threshing and separating system carried by the chassis and including at least one threshing rotor mounted in a longitudinal direction of the agricultural harvester; a grain pan carried by the chassis that receives crop material from the threshing and separating system, the grain pan being configured to shake in a fore-to-aft direction and a lateral direction; and a cleaning system carried by the chassis supplied with crop material from the grain pan, the cleaning system including at least one sieve configured to shake in the lateral direction out of phase with the grain pan.

The invention in another form is directed to a method of controlling crop material transport through an agricultural harvester having a chassis including the steps of: shaking a grain pan carried by the chassis in a fore-to-aft direction to convey crop material toward a cleaning system carried by the chassis; providing a controller carried by the chassis that controls shaking of the grain pan; shaking the grain pan in a lateral direction; and shaking at least one sieve of the cleaning system in the lateral direction out of phase with the grain pan.

An advantage of the present invention is shaking the grain pan in the lateral direction can more evenly distribute the crop material supplied to the cleaning system.

Another advantage is the lateral shaking can evenly distribute the crop material earlier in its travel path than known systems.

Yet another advantage is a controller can be utilized to control a shake profile of the grain pan to produce a desired crop material distribution on the grain pan.

Yet another advantage is that laterally shaking the sieve of the cleaning system out of phase with the grain pan can reduce machine vibrations thereby improving vehicle durability and operator comfort.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
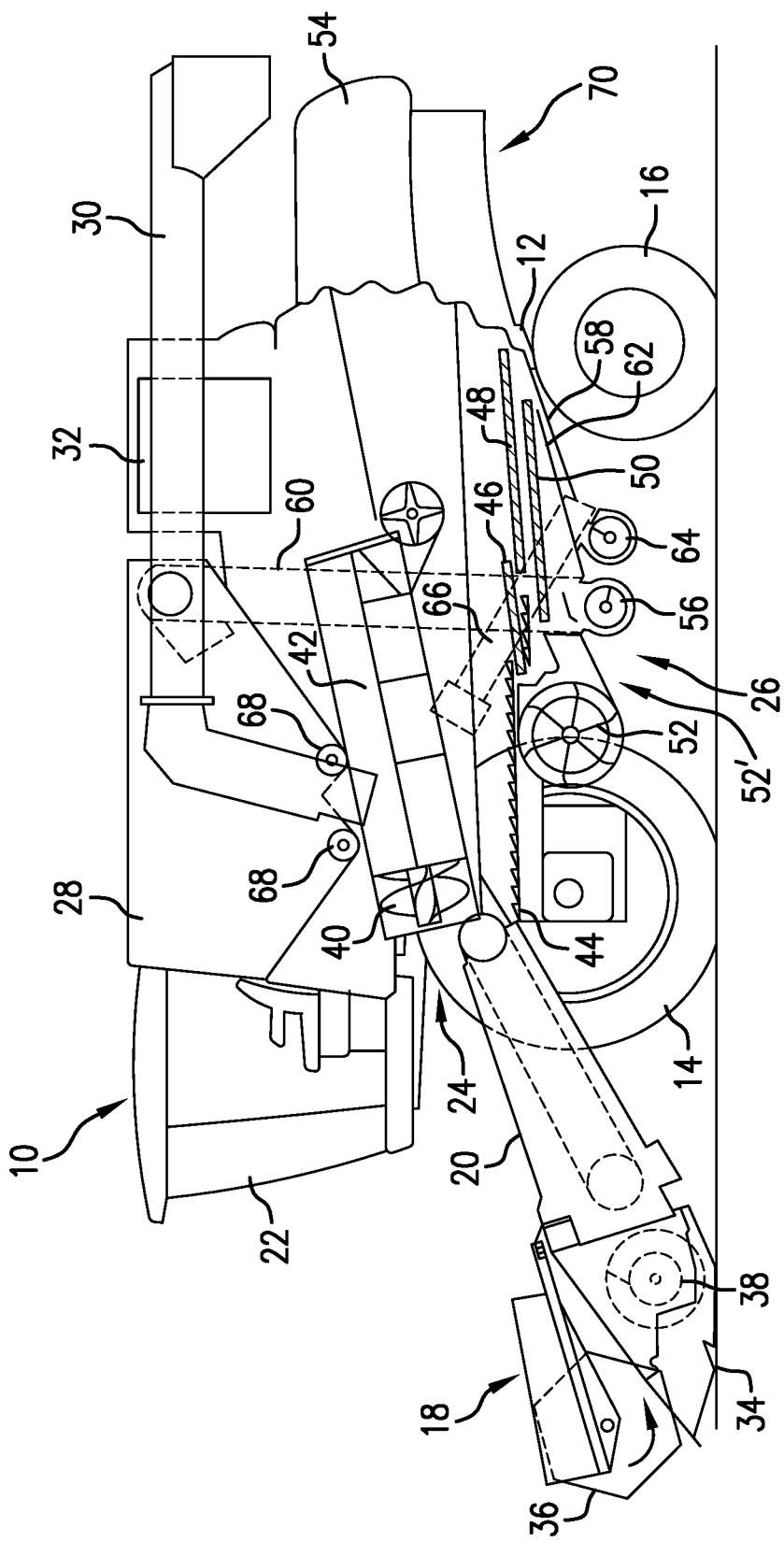
FIG. 1 is a side view of an embodiment of an agricultural harvester according to the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30. It should be appreciated that while the agricultural harvester is shown as combine 10, the agricultural harvester according to the present invention can be any type of construction that allows for crop material to be harvested such as a conventional combine (which does not have a rotor), rotary combine, hybrid combine, chopper harvester, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. As can be seen, the rotor 40 is mounted in a longitudinal direction of the combine 10 so that as the rotor 40 rotates the crop material flows along the length of the rotor 40 toward the back of the combine 10.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a shoe sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from clean grain pan 62 of cleaning system 26. Clean grain auger 56 conveys the clean grain laterally to a generally vertically arranged elevator 60, which can also be referred to as a grain elevator, for transport to grain tank 28. Tailings from cleaning system 26 fall to a tailings pan 58. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 may include a chopper, counter knives, a windrow door and a residue spreader.

Figure 2:
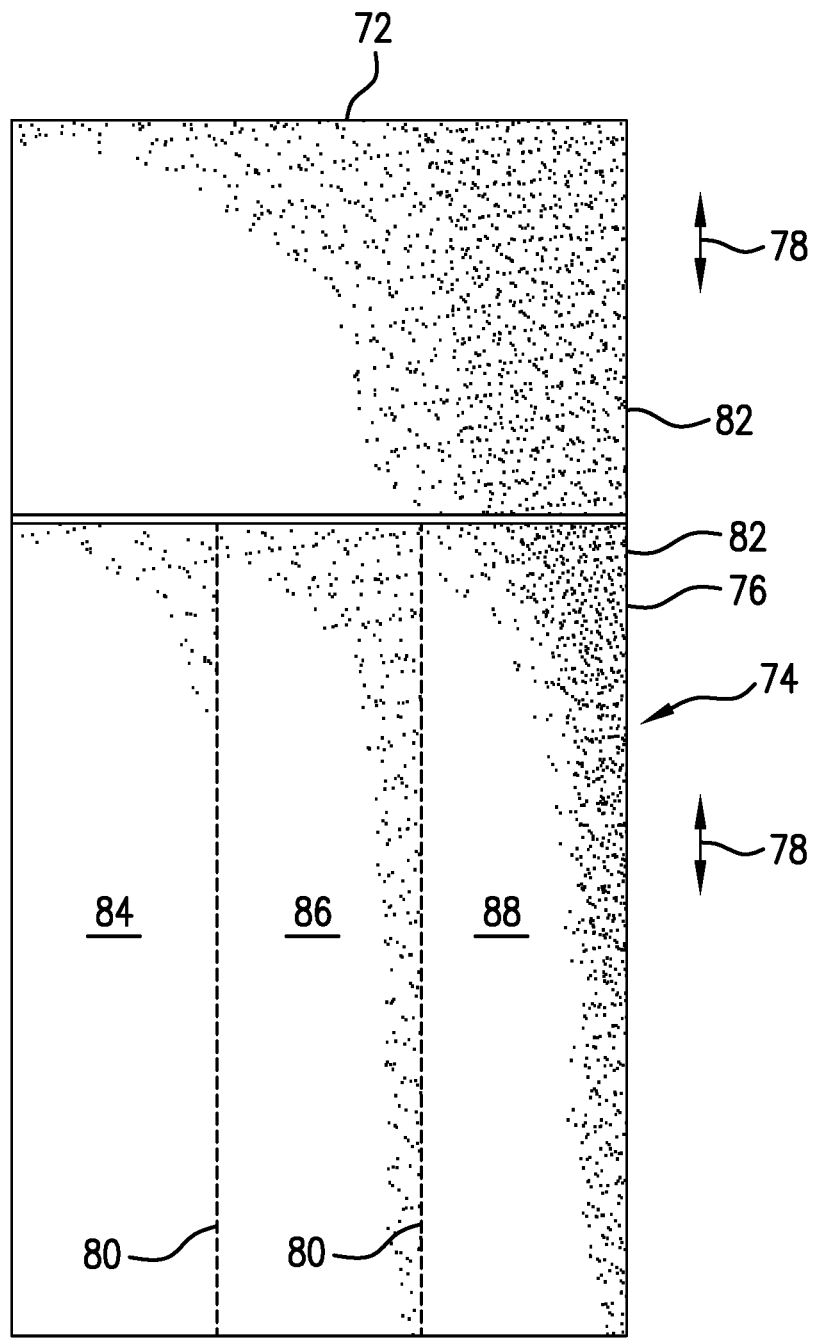
FIG. 2 is a plan view of a grain pan and cleaning system according to the prior art that is tilted with a corresponding representative crop material distribution illustrated.

Referring now to FIG. 2, an embodiment of a prior art grain pan 72 and cleaning system 74 including a sieve 76 is shown. The prior art grain pan 72 oscillates in a fore-to-aft direction, represented by arrows 78, and the cleaning system 74 also oscillates in the fore-to-aft direction. As can be seen, the sieve 76 includes dividers 80 that extend along a length of the sieve 76 in the fore-to-aft direction 78. When the grain pan 72 and cleaning system 74 are tilted on a down-hill slope toward a right side 82 of the grain pan 72 and cleaning system 74, crop material that falls onto the grain pan 72 tends to accumulate on the right side 82 of the grain pan 72 as it travels toward the cleaning system 74. The cleaning system 74, which can be divided into a first region 84, second region 86, and third region 88 by the dividers 80, will therefore tend to have little crop material supplied to the first and second regions 84 and 86, while the third region 88 on the right side 82 receives the majority of the supplied crop material. This can lead to the third region 88 being supplied with too much crop material to properly clean, reducing the efficiency of the cleaning system 74.

Figure 3:
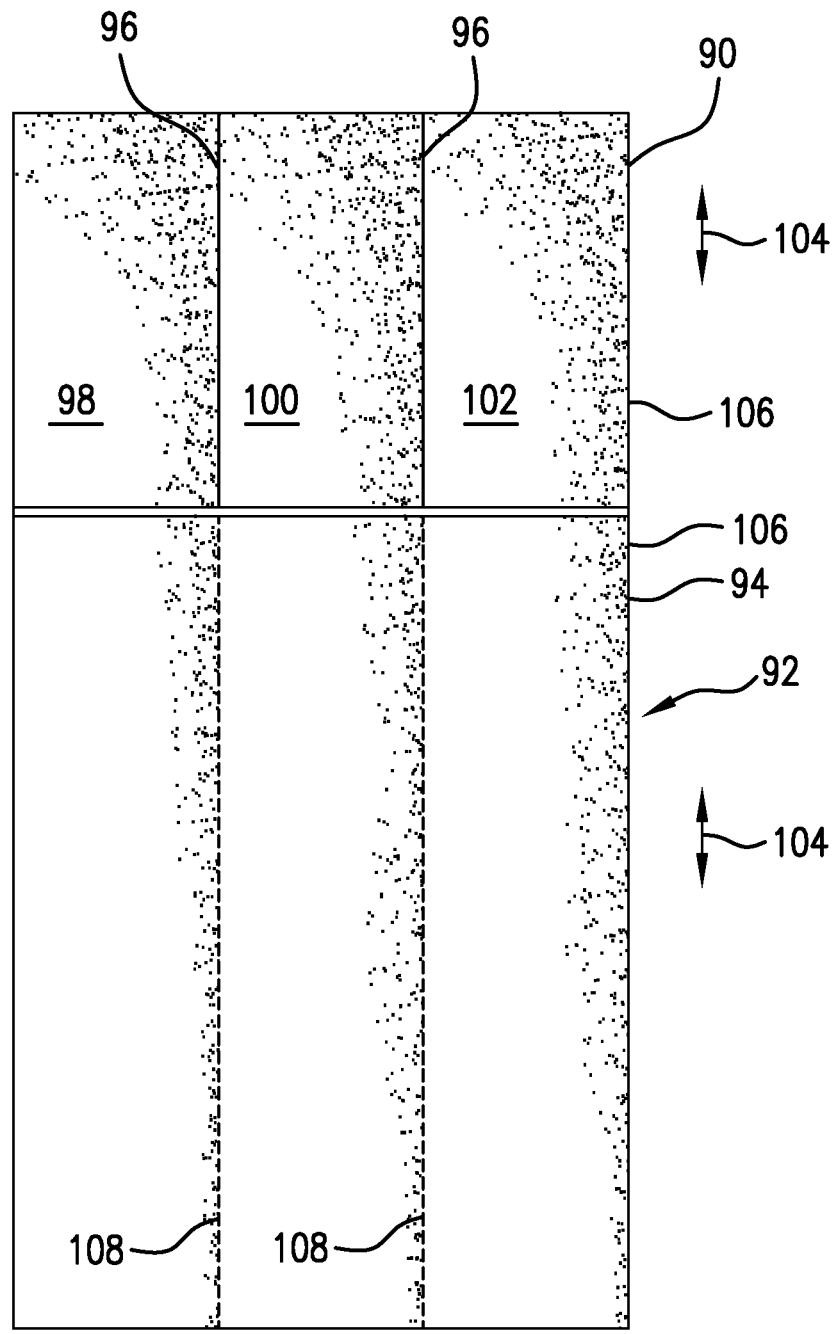
FIG. 3 is a plan view of another grain pan and cleaning system according to the prior art that is tilted with a corresponding representative crop material distribution illustrated.

Referring now to FIG. 3, another embodiment of a prior art grain pan 90 and a cleaning system 92 including a sieve 94 is shown. As can be seen, the grain pan 90 and cleaning system 92 are similar to the grain pan 72 and cleaning system 94 shown in FIG. 2, with the exception that the grain pan 90 has dividers 96 separating the grain pan 90 into a first pan region 98, a second pan region 100, and a third pan region 102. The grain pan 90 and cleaning system 92 still oscillate in a fore-to-aft direction, indicated by arrow 104. As shown, the grain pan 90 and cleaning system 92 are tilted down toward a right side 106 of the grain pan 90 and cleaning system 92, causing crop material to accumulate along the dividers 96 of the grain pan 90 and dividers 108 of the sieve 94. While this construction offers an improvement of how much crop material is supplied to each region (unnumbered) of the sieve 94, the crop material distribution on the sieve 94 is still mostly biased along the dividers 108 of the sieve 94.

Figure 4:
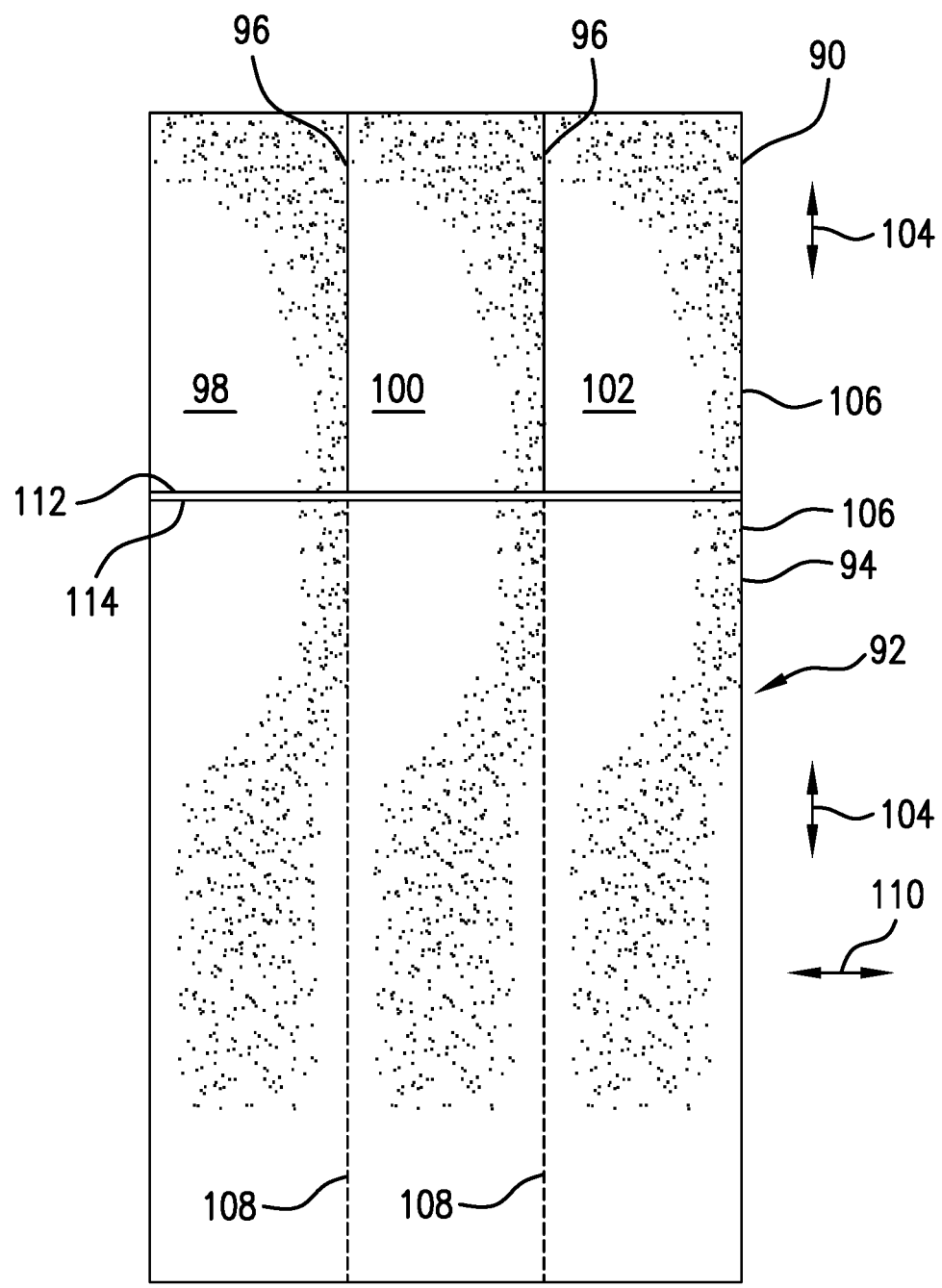
FIG. 4 is a plan view of the grain pan and cleaning system shown in FIG. 3 with a different shake profile compared to the grain pan and cleaning system shown in FIG. 3.

Referring now to FIG. 4, the embodiment of the grain pan 90 and cleaning system 92 shown in FIG. 3 is shown with the sieve 94 being able to oscillate in the fore-to-aft direction 104 as well as a lateral direction, indicated by arrow 110. The sieve 94 oscillating in the lateral direction 110 helps offset the tilt of the grain pan 90 and sieve 94 by providing an offsetting lateral force to the crop material on the sieve 94 opposed to the downhill tilt of the sieve 94, spreading the crop material more evenly on the sieve 94 along a length of the sieve 94. Such a configuration evenly spreads the crop material out on the sieve 94 past a certain point of the sieve 94, but, as can be seen, the distribution is still biased toward the dividers 96 and 108 of the grain pan 90 and sieve 94, respectively, near a rearward end 112 of the grain pan 90 and a forward end 114 of the sieve 94.

Figure 5:
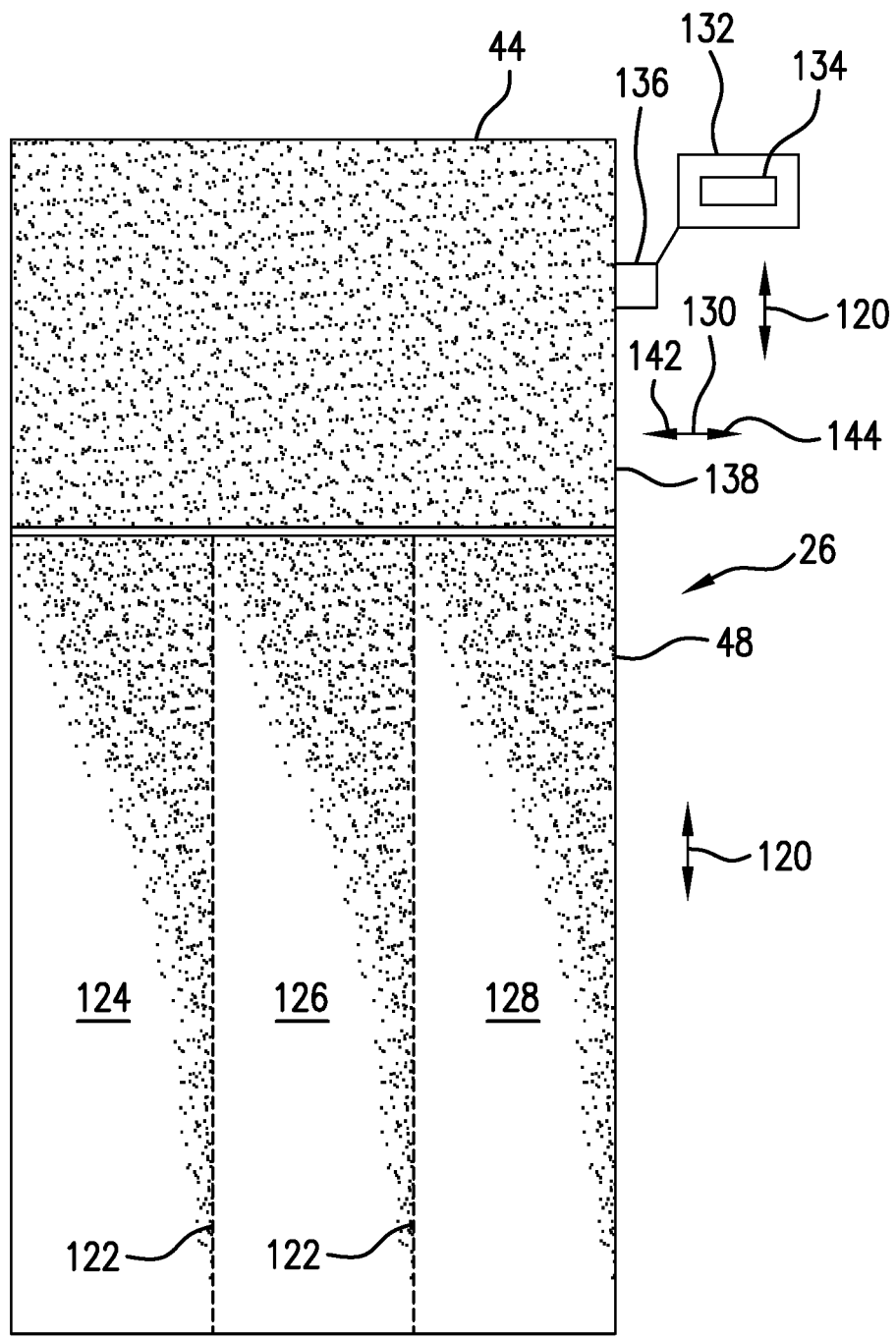
FIG. 5 is a plan view of an embodiment of a grain pan and cleaning system according to the present invention that is tilted with a corresponding representative crop material distribution illustrated.
Figure 6:
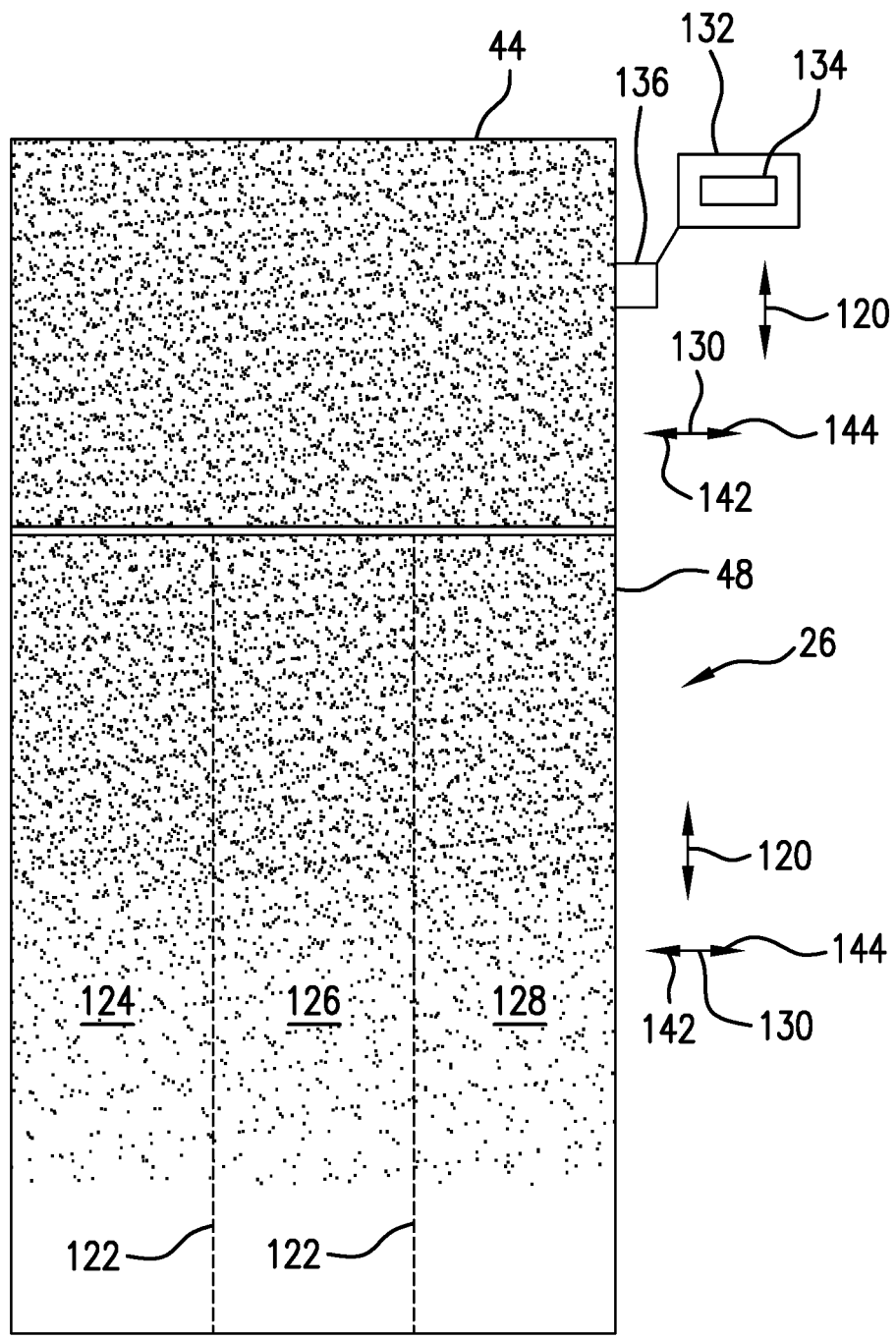
FIG. 6 is a plan view of the grain pan and cleaning system shown in FIG. 5 with the cleaning system having a sieve that can shake in the lateral direction.
Figure 7:
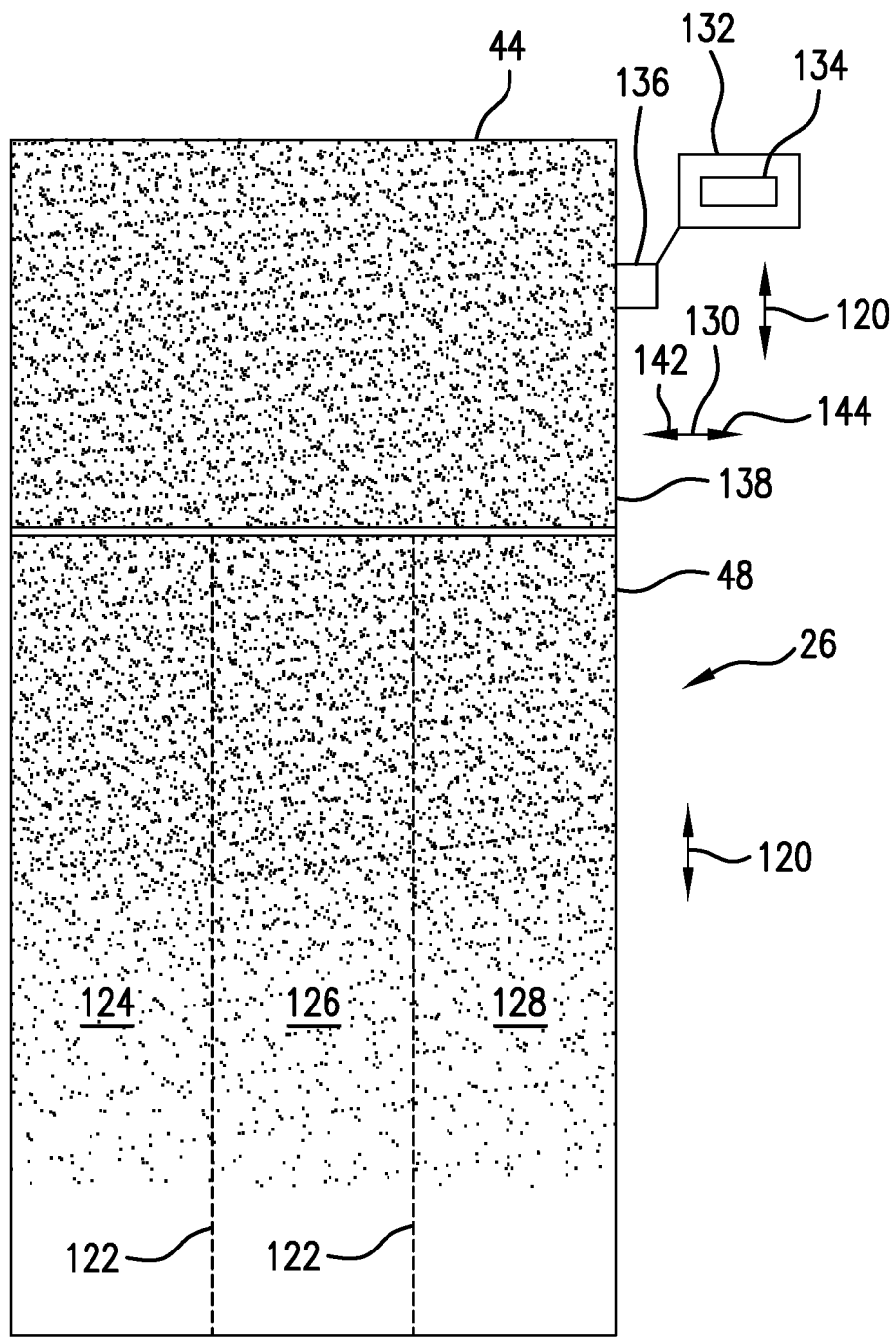
FIG. 7 is a plan view of the grain pan and cleaning system shown in FIG. 5 with the cleaning system including a self-levelling sieve.

Referring now to FIG. 5, an embodiment of a grain pan 44 and cleaning system 26 which can include sieves 46, 48, and 50 according to the present invention is shown. The grain pan 44, as opposed to sieves 46, 48 and 50, can be constructed of a corrugated material, such as corrugated metal, and shake in a fore-to-aft direction, indicated by arrow 120, to convey threshed crop material toward the cleaning system 26. As used herein, the fore-to-aft direction 120 corresponds to the direction of forward and backward travel of the agricultural harvester 10 during operation. After shaking off the grain pan 44, crop material drops onto one of the sieves 46, 48, or 50 of the cleaning system 26 which also shakes in the fore-to-aft direction 120, helping to separate the grain from the MOG with the assistance of the cleaning fan 52. For ease of description and illustration, only upper sieve 48 is shown in FIGS. 5-7 and described in relation to these figures, but it should be appreciated that all the sieves 46, 48 and 50 of the cleaning system 26 can be configured similarly if desired. While grain is described as being the crop material separated from MOG, it is contemplated that the grain pan 44 and cleaning system 26 can be used to transport and clean any type of crop material. Unlike the grain pan 44, which can be constructed of a solid corrugated material, the sieve 48 has openings (not shown) formed therein that separated grain can fall through to the clean grain auger 56 for transport to the elevator 60. The sieve 48 can also include dividers 122 that extend in the fore-to-aft direction 120, separating the sieve 48 into a first region 124, second region 126, and third region 128. It should be appreciated that fewer or more dividers 122 can be included to separate the sieve 48 into a lower or higher number of regions, if desired.

To better distribute crop material that is supplied to the sieve 48, the grain pan 44 is configured to shake in a lateral direction, indicated by arrow 130, in addition to the fore-to-aft direction 120. The grain pan 44 can shake in the lateral direction 130 and fore-to-aft direction 120 using any movement mechanism, such as mechanisms that are known to shake sieves in the fore-to-aft and lateral directions. By shaking the grain pan 44 in both the fore-to-aft direction 120 and lateral direction 130, the distribution of crop material to the sieve 48 can be controlled earlier in the cleaning process to efficiently utilize the surface area of the sieve 48.

In order to determine when the grain pan 44 should shake in the lateral direction 130, a controller 132 coupled to a mechanism (not shown) shaking the grain pan 44 can be provided that controls the mechanism's movement. In this sense, the controller 132 can follow a shake profile of the grain pan 44 that determines the sequence of the grain pan 44 shaking in the fore-to-aft direction 120 and lateral direction 130 and output the appropriate shaking commands to the mechanism that shakes the grain pan 44. The mechanism can be any type of mechanism that can shake the grain pan 44 in the lateral direction 130. Such an exemplary mechanism is described in U.S. Pat. No. 8,939,829, which is partially incorporated herein and fully incorporated by reference, describing a side-shaking actuating system applied to the sieves of a combine harvester that can be adapted to shake the grain pan 44 of the present invention. The controller 132 can be any type of controller, digital or analog, that can output signals to the shaking mechanism to control the shaking of the grain pan 44. For example, a shake profile of the grain pan 44 might be configured as a continuous loop of 10 mm of rightward sideshake to accommodate a given side slope, with the controller 132 sending appropriate signals to the shaking mechanism to shake the grain pan 44 according to this shake profile until the controller 132 is adjusted to follow a different shake profile. If desired, shaking in the fore-to-aft direction 120 and lateral direction 130 can be combined into a single shake in a resultant direction that is a resultant of shakes in both directions 120 and 130 as vectors. One or more shake profiles followed by the controller 132 can be manually or automatically programmed into a memory module 134 of the controller 132, with a user being able to input new shake profiles into the memory module 134 or selecting a pre-programmed shake profile in the memory module 134 for the controller 132 to follow. The shake profile followed by the controller 132 can therefore be adjusted to a variety of conditions, such as the agricultural harvester 10 being on a side slope, the threshing and separating assembly 24 not distributing crop material to the grain pan 44 correctly, operator selected bias based on known harvesting conditions, uneven crop material distribution across the grain pan 44, etc.

To better adjust the shake profile to varying conditions that arise during the harvesting operation, a sensor 136 can be coupled to the controller 132 and be configured to measure a variety of operating conditions during harvesting. For example, the sensor 136 can be a tilt sensor that determines when the agricultural harvester 10 is harvesting on a side slope, which will angle the grain pan 44 and cleaning system 26. When the tilt sensor 136 detects that the agricultural harvester 10 is on a side slope that can affect the distribution of crop material from the grain pan 44 to the cleaning system 26, such as a downhill slope toward a right side 138 of the grain pan 44, the tilt sensor 136 can output a signal to the controller 132 that signals the grain pan 44 is tilting at a certain angle downhill toward the right side 138 of the grain pan 44. The controller 132 can be programmed to automatically change the shake profile of the grain pan 44 to compensate for the tilting of the grain pan 44 that is signaled by the tilt sensor 136, providing a higher or lower frequency of shakes in the lateral direction 130 to keep crop material distribution across the grain pan 44 even as the crop material is conveyed toward the cleaning system 26. Further, the controller 132 can control the magnitude of the shake force applied to the grain pan 44 in the lateral direction 130, which can be modified as a part of the shake profile. While the sensor 136 is described as a tilt sensor, the sensor 136 can be other types of sensors that detect various operating conditions of the grain pan 44 and cleaning system 26 such as an optical sensor or load sensor configured to detect crop material distribution across the grain pan 44 visually or based on weight, respectively. It should therefore be appreciated that a wide variety of sensors can be coupled to the controller 132 to help control the shaking of the grain pan 44 and distribute crop material to the cleaning system 26.

Referring now to FIG. 6, the grain pan 44 and cleaning system 26 shown in FIG. 5 are again illustrated, but the sieve 48 of the cleaning system 26 is shown configured to also shake in the lateral direction 130 as well as the fore-to-aft direction 120. Such a configuration allows the grain pan 44 to evenly distribute crop material to the sieve 48 by shaking in the fore-to-aft direction 120 and lateral direction 130 and the sieve 48 of the cleaning system 26 to maintain the even distribution of crop material across the surface of the sieve 48 by shaking in the fore-to-aft direction 120 and lateral direction 130. Although upper sieve 48 is only shown as being configured to shake in the lateral direction 130, the lower sieve 50 can also be configured to shake in the lateral direction 130, which will be further described herein. A mechanism (shown in FIGS. 9-13), which can be the mechanism described in U.S. Pat. No. 8,939,829 previously described, can be connected to the sieve 48 to shake the sieve 48 in the lateral direction 130 and, optionally, the fore-to-aft direction 120 and be coupled to the controller 132 to control the shake profile of the sieve 48. By coupling the controller 132 to both mechanisms that control lateral shaking of the grain pan 44 and sieve 48, the lateral shaking of the grain pan 44 and sieve 48 can be synchronized to counter-balance each other and/or work in symphony to better distribute crop material along the surface of the sieve 48.

Referring now to FIG. 7, the grain pan 44 and cleaning system 26 shown in FIG. 5 are shown with the sieve 48 of the cleaning system 26 being able to self-level during operation of the agricultural harvester 10, i.e., the sieve 48 can respond to changes in inclination of the agricultural harvester 10 by responsively angling itself to correct for the inclination. This can allow the sieve 48 to be unaffected by an inclination of the agricultural harvester 10 so the crop material distribution on the surface of the sieve 48 stays constant on an incline without having to shake the sieve 48 in the lateral direction 130. The sieve 48 will still shake in the fore-to-aft direction 120 to convey the crop material across the surface of the sieve 48, but does not need to shake in the lateral direction 130 to compensate for tilt of the sieve 48. The self-levelling sieve 48 can also be controlled by the controller 132, which can control when the self-levelling sieve 48 angles itself and the degree of the self-levelling angle. Any type of suitable self-levelling sieve can be included in the cleaning system 26, with several being known in the art that can be included in the agricultural harvester 10 of the present invention.

Figure 8:
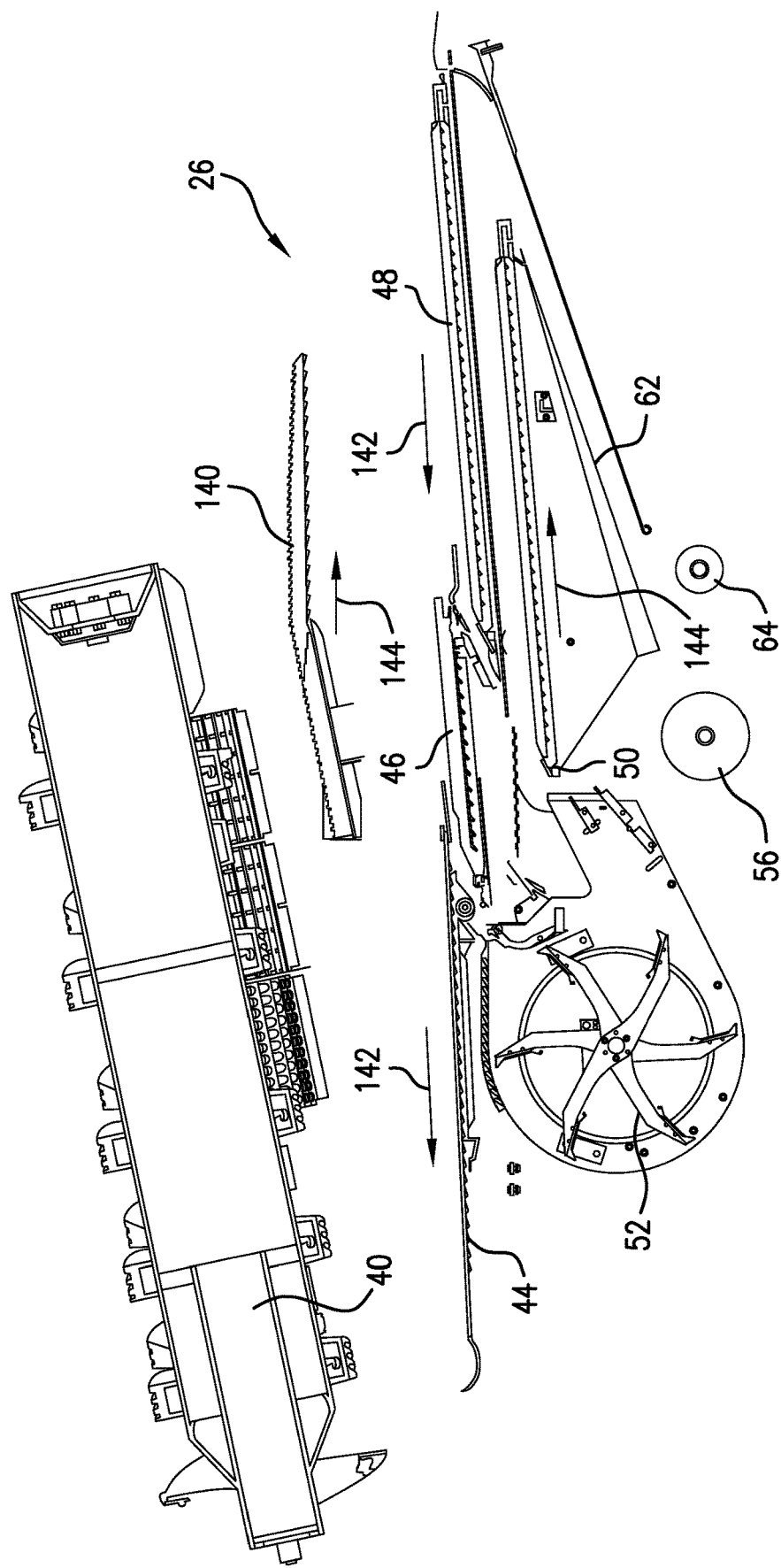
FIG. 8 is a sectional view of the agricultural harvester shown in FIG. 1 with an optional return pan.

Referring now to FIG. 8, the agricultural harvester 10 is shown with an optional return pan 140 placed under a section of the rotor 40. The return pan 140 also shakes in the fore-to-aft direction 120 so that crop material that falls onto the return pan 140 from a farther downward portion of the rotor 40 can be returned back toward the grain pan 44 by the return pan 140 to allow this crop material to pass through most of the cleaning system 26, rather than falling onto one of the cleaning sieves 46, 48 or 50 near an end of the sieve 46, 48, 50. The return pan 140 can also shake in the lateral direction 130 similar to the grain pan 44 and cleaning sieves 46, 48 and 50 and be shaken in the lateral direction 130 by a similar mechanism that is coupled to the controller 132.

As the grain pan 44, cleaning sieves 46, 48, 50 and/or return pan 140 shake in the lateral direction 130, the shaking action of the elements produce lateral forces that can cause vibrations in the agricultural harvester 10 that are absorbed by surrounding components and can prematurely wear the absorbing components. To offset these lateral forces, some of the components, such as the grain pan 44 and upper sieve 48, can shake in one directional component of the lateral direction 130, designated as arrow 142 in FIG. 8, simultaneously while another component, such as the lower sieve 50, shakes in a different directional component of the lateral direction 130, designated as arrow 144, that is opposite to the lateral component 142 that the grain pan 44 and upper sieve 48 shake. It should be appreciated that the arrows 142 and 144 in FIG. 8 representing lateral components are intended only to illustrate the lateral component that each element can shake relative to the other lateral shaking elements at any given time and that the lateral direction 130 shown in FIGS. 5-7 is the actual direction that the elements will shake. The grain pan 44 and upper sieve 48 can thus shake in the lateral direction 130 in phase with one another while the lower sieve 50 can shake out of phase in the lateral direction 130 relative to the grain pan 44 and upper sieve 48. The lower sieve 50 can shake, for example, 91 degrees or more out of phase with the grain pan 44 and/or upper sieve 48 so that the lower sieve 50 is shaking in a lateral direction opposite the grain pan 44 and/or upper sieve 48. In other words, the grain pan 44 and upper sieve 48 can shake simultaneously so that both the grain pan 44 and upper sieve 48 have relative lateral displacement from normal in one lateral component 142 of the lateral direction 130 while the lower sieve 50 simultaneously has a lateral displacement from normal in the opposite lateral component 144 of the lateral direction 130. The "normal" described herein can thus be the relative position of the grain pan 44, upper sieve 48 and lower sieve 50 when these elements are not shaking in the lateral direction 130 or the midpoint between the maximum displacement each element experiences in either lateral component 142 or 144 of the lateral direction 130. The degree that the lower sieve 50 can shake out of phase with the grain pan 44 and/or upper sieve 48 can vary considerably depending upon the configuration of the cleaning system 26, with contemplated values being between 91 degrees to 269 degrees so that lateral shaking of the lower phase 50 can be in the opposite direction of the grain pan 44 and/or upper sieve 48. For example, the lower sieve 50 can shake 180 degrees out of phase with the grain pan 44 and/or upper sieve 48 so that the lower sieve 50 has an equal displacement or force, relative to normal, to the grain pan 44 and/or upper sieve 48, but in the opposite lateral direction. If the return pan 140 is included, the return pan 140 can shake in the lateral component 144 of the lateral direction 130 in phase with the lower sieve 50, i.e., 91 degrees or more out of phase with the grain pan 44 and upper sieve 48 shaking in the lateral component 142. This allows the lower sieve 50 and return pan 140 to shake together in the lateral component 144 of the lateral direction 130 opposingly to the grain pan 44 and lower sieve 50 in order to offset vibrations caused by forces created as the grain pan 44 and upper sieve 48 shake in the lateral component 142 of the lateral direction 130.

The controller 132 can be configured to control the mechanisms shaking the grain pan 44, upper sieve 48, lower sieve 50, and/or return pan 140 so that each respective mechanism shakes its component in the appropriate lateral component 142 or 144 of the lateral direction 130 so that some of the components simultaneously shake with each other in one of the lateral components 142, 144 of the lateral direction 130 and other components shake in the opposite lateral component 144, 142 of the lateral direction 130. To assist in reducing vibrations in the agricultural machine 10, the sensor 136 that can be coupled to the controller 132 can be a vibration sensor that detects the presence and magnitude of vibrations in the agricultural vehicle 10, such as in a side sheet of the vehicle 10. Once a vibration and its associated magnitude is measured by the vibration sensor, the controller 132 can initiate offsetting lateral shaking of the grain pan 44, upper sieve 48, lower sieve 50 and/or return pan 140 and control the amount of offsetting lateral shaking that occurs to reduce the vibrations in the vehicle 10. Coupling the controller 132 with a vibration sensor can thus reduce wear on the various components by only initiating the offsetting lateral shaking when needed, reduce the amount of power used by the lateral shaking mechanisms, and reduce the risk of further vibrations being caused by over-compensating for vibrations due to using too much offsetting lateral shaking.

Figure 9:
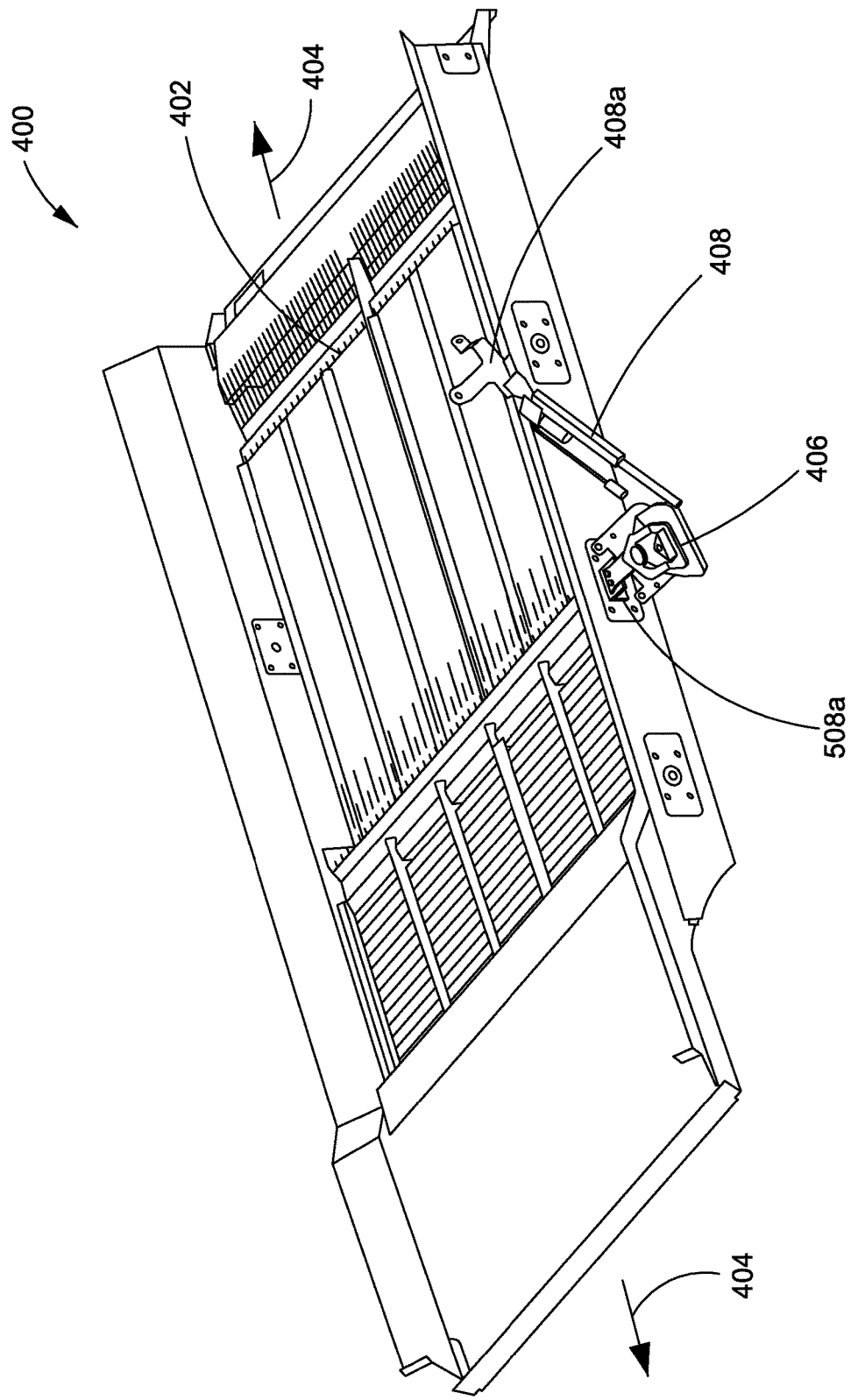
FIG. 9 is a perspective view of a prior art agricultural harvester side-shaking control system that can be used with embodiments of the present invention.

Referring now to FIGS. 9-13, various prior art mechanisms that can be used to provide both fore-to-aft and lateral shaking to the grain pan 44, upper sieve 48, lower sieve 50, and/or return pan 140 of the present invention are shown. FIG. 9 illustrates a combine side-shaking control system 400. As shown in FIG. 9, the side-shaking control system 400 may include a sieve 402 for separating crop material from other materials. The sieve 402 may be configured to move in a fore-aft direction shown by arrows 404. Side-shaking control system 400 may include side-shaking assembly 406 and an actuation device 408, which can be rigidly attached to a vehicle chassis by an actuation device mounting portion 408a. A controller 712 (shown in FIG. 12) can be coupled to the actuation device 408 to control the motion of the side-shaking assembly 406.

Figure 13:
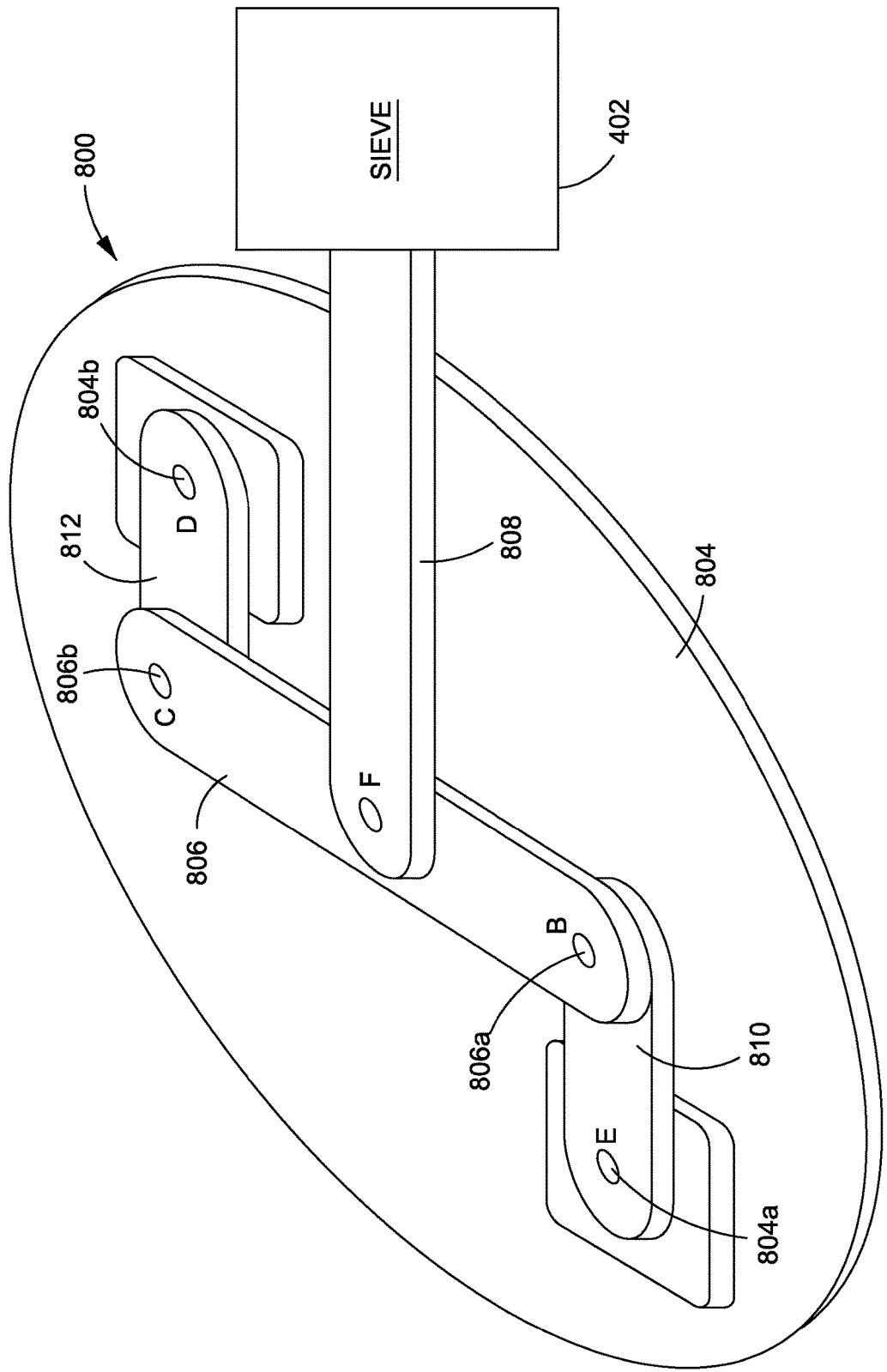
FIG. 13 is a schematic diagram of a prior art side-shaking assembly illustrating another linkage that can be used with embodiments of the present invention.

The combine side-shaking control systems may include side-shaking assemblies having different linkage configurations for converting rotational motion to approximate straight-line motion. The combine side-shaking control system may include a side-shaking assembly 406 having a linkage, which may be referred to as a Robert's linkage, configuration for converting rotational motion to approximate straight-line motion. In other embodiments, a combine side-shaking control system may include a side-shaking assembly 800 having a different linkage, which can be referred to as a Watt's linkage, configuration for converting rotational motion to approximate straight-line motion. FIG. 13 is a perspective view of an exemplary side-shaking assembly illustrating a Watt's linkage that can be used with embodiments of the present invention. It is contemplated that other linkage configurations may be used for converting rotational motion to approximate straight-line motion.

Figure 10B:
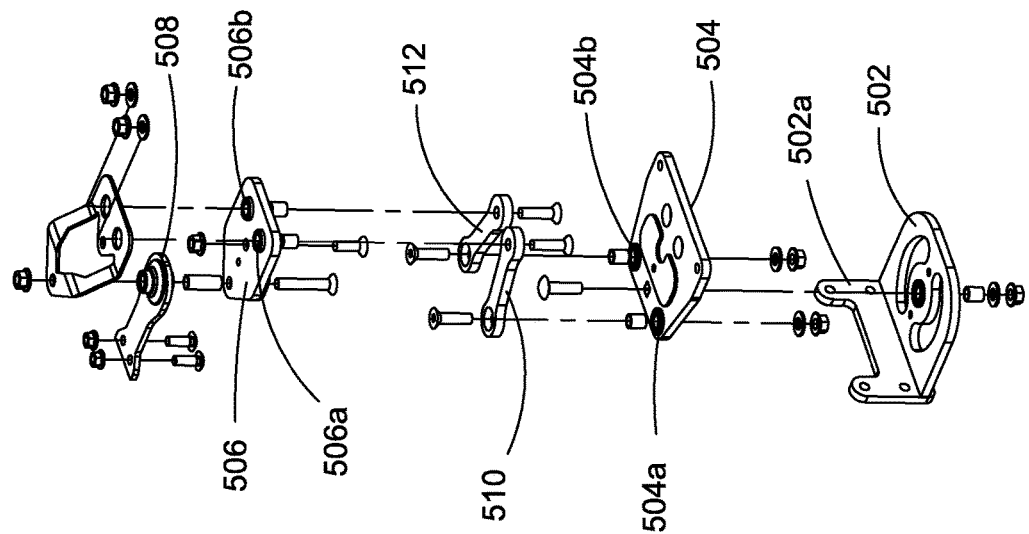
FIG. 10B is an exploded view of the prior art side-shaking assembly shown in FIG. 10A illustrating a linkage that can be used with embodiments of the present invention.
Figure 10A:
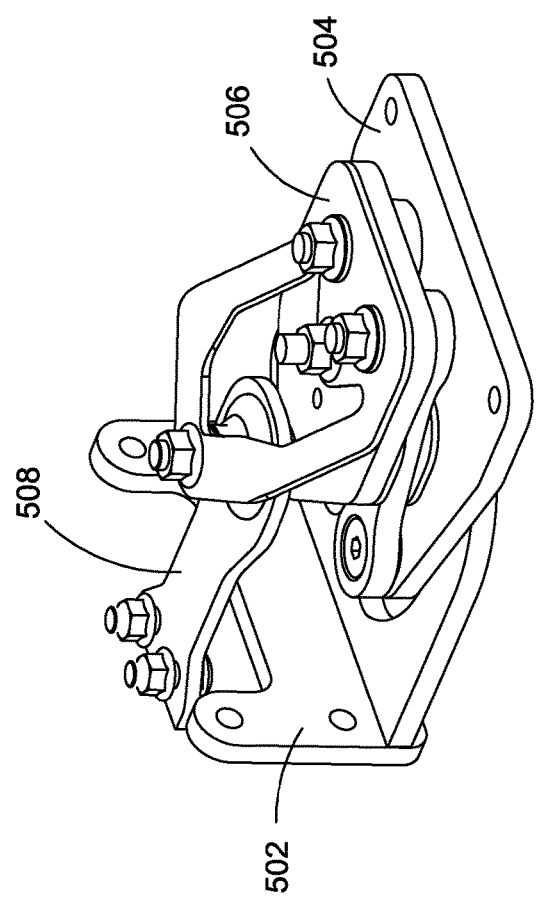
FIG. 10A is a perspective view of the prior art side-shaking assembly shown in FIG. 9 illustrating a linkage that can be used with embodiments of the present invention.
Figure 12:
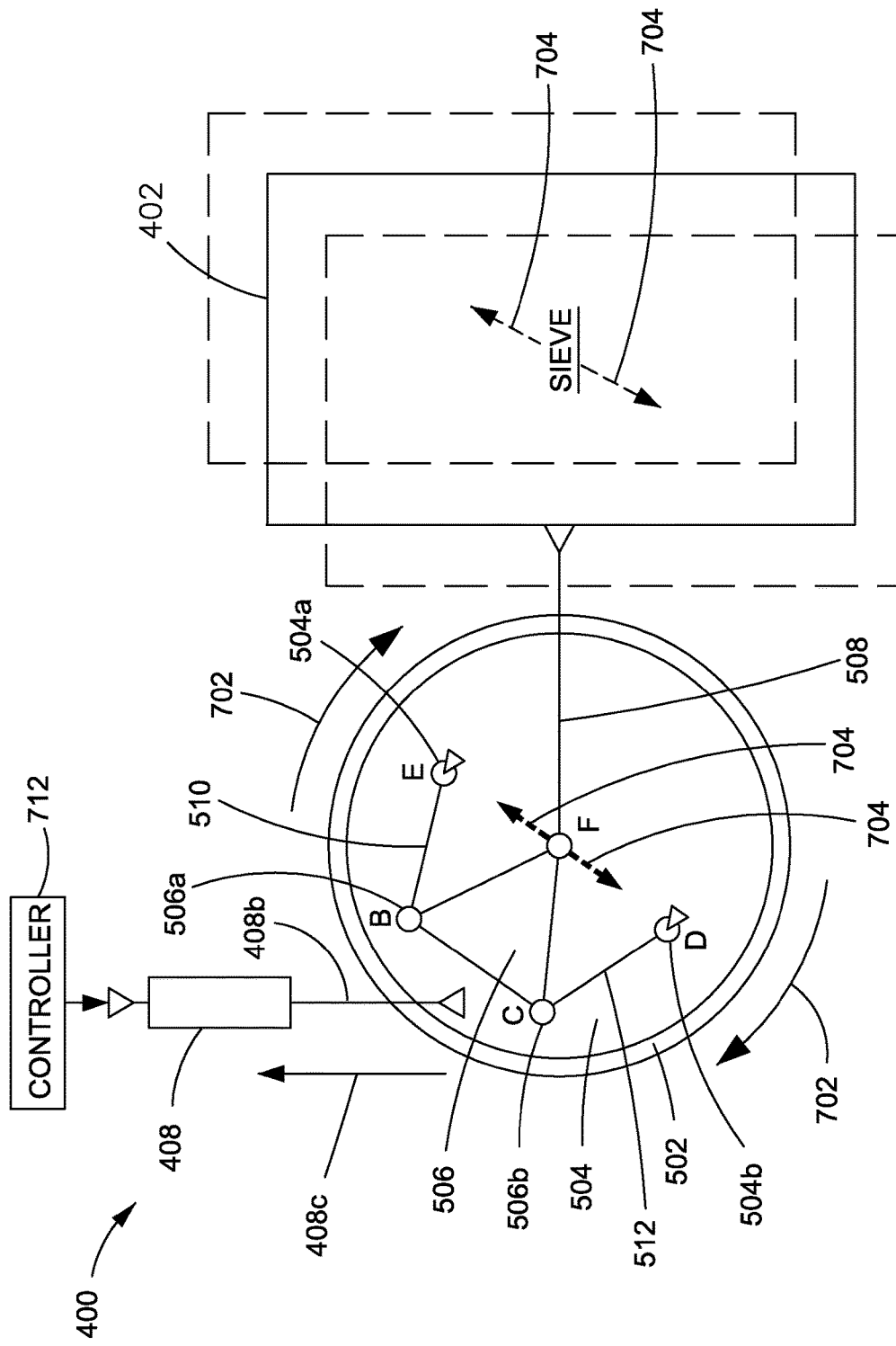
FIG. 12 is a schematic diagram illustrating the prior art sieve, actuation device and side-shaking assembly shown in FIG. 4 in an engaging position that can be used with embodiments of the present invention.

Referring to FIGS. 10A and 10B, the side-shaking assembly 406 (shown in FIG. 9) illustrates a Robert's linkage that can be used with embodiments of the present invention. FIG. 10B is an exploded view of the side-shaking assembly 406 shown in FIG. 10A. As shown in FIGS. 10A and 10B, side-shaking assembly 406 can include a side-shaking mounting device 502 that rigidly attaches to a vehicle chassis. Side-shaking assembly 406 also includes a lower plate 504 and an upper plate 506 coupled to the lower plate 504. Side-shaking assembly 406 also includes a first pivot arm 510 coupled to lower plate 504 at a first lower plate pivot portion 504a and coupled to upper plate 506 at a first upper plate pivot portion 506a. Side-shaking assembly 406 also includes a second pivot arm 512 coupled to the lower plate 504 at a second lower plate pivot portion 504b spaced from the first lower plate pivot portion 504a and coupled to the upper plate 506 at a second upper plate pivot portion 506b spaced from the first upper plate pivot portion 506a. Side-shaking assembly 406 may further include a fixed arm 508 rotatably coupled to the upper plate 506 and rigidly attached to the sieve 402 (as shown in FIG. 12). Fixed arm 508 may also include a fixed arm mounting portion for rigidly attaching fixed arm 508 to the sieve 402. Side-shaking assembly 406 may further include a support device 514 rigidly attached to both fixed arm 508 and upper plate 506. The fixed arm 508 and the support device 514 can be separate components that are not included as part of the side-shaking assembly 406.

Figure 11B:
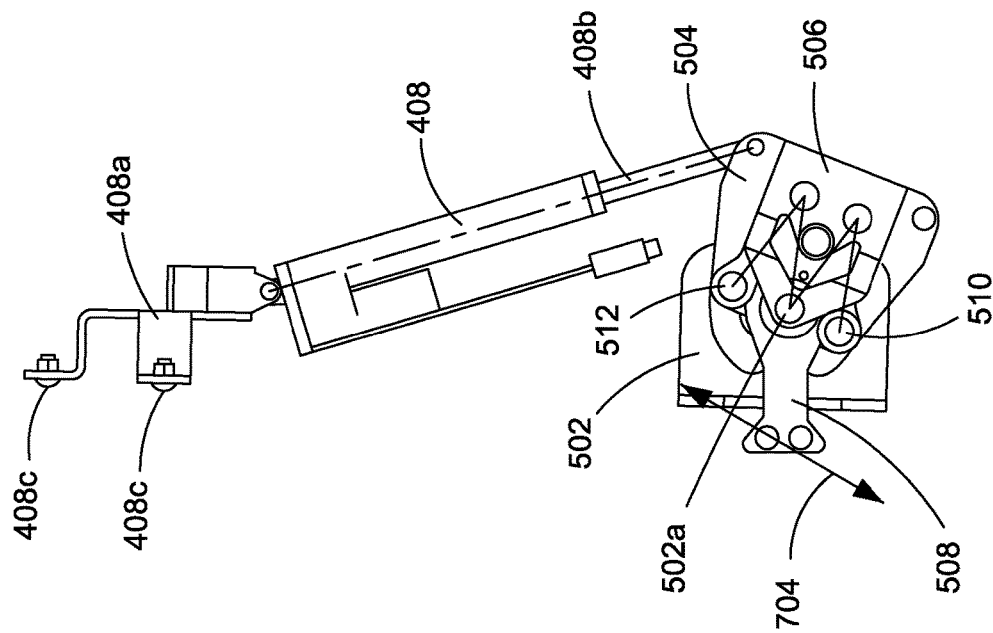
FIG. 11B is a top view of the prior art actuation device and side-shaking assembly shown in FIG. 9 in an engaging position that can be used with embodiments of the present invention.
Figure 11A:
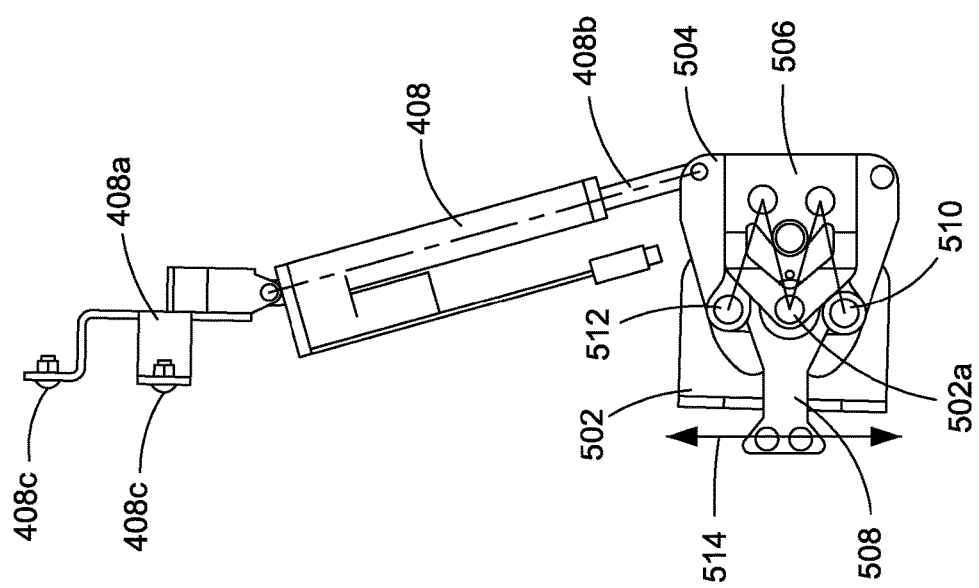
FIG. 11A is a top view of the prior art actuation device and side-shaking assembly shown in FIG. 9 in a non-engaging position that can be used with embodiments of the present invention.

When the lower plate 504 and the upper plate 506 are in the non-engaging position, the side-to-side component of the sieve 402 is not engaged. When the lower plate 504 and the upper plate 506 are in the engaging position, the side-to-side component of the sieve 402 is engaged. FIGS. 11A, 11B and 12 illustrate relative movements of elements of the side-shaking assembly 406, actuation device 408 and sieve 402 shown in FIG. 9. FIG. 11A is a top view of actuation device 408 and side-shaking assembly 406 in a non-engaging position. FIG. 11B is a top view of actuation device 408 and side-shaking assembly 406 in an engaging position. FIG. 12 is a schematic diagram illustrating sieve 402, actuation device 408 and side-shaking assembly 406 in an engaging position.

As shown in FIG. 11A, actuation device 408 may include fasteners 408c and an actuation device mounting portion 408a. Actuation device mounting portion 408a may be used to rigidly attach the actuation device 408 to the vehicle chassis. It is contemplated that an actuation device may be directly attached to the chassis or may be attached to the chassis using a mounting portion having a different size and shape. Actuation device 408 is coupled to the lower plate 504.

Upper plate 506 may be configured to have a substantially linear upper plate motion in a substantially linear direction. For example, as shown in FIG. 11A, when actuation device moving portion 408b is in the position shown in FIG. 11A, the lower plate 504 and the upper plate 506 are in a non-engaging position. When the lower plate 504 and the upper plate 506 are in the non-engaging position, the upper plate 506 is configured to have a non-engaging substantially linear motion in the fore-aft direction. The sieve 402 may be controlled to remain stationary or move in the fore-aft direction, when the lower plate 504 and the upper plate 506 are in the non-engaging position. The fore-aft motion may be controlled by an actuation device different from the actuation device 408. When the sieve 402 moves in the fore-aft direction, the fixed arm 508 may be configured such that the fore-aft motion of the sieve 402 is in the substantially linear direction of the upper plate motion.

The lower plate 504 may be rotatably coupled to the mounting device 502 and configured to rotate about a lower plate axis 502a (shown in FIG. 9). Actuation device 408 may be configured to rotate the lower plate 504 about the lower plate axis 502a. For example, as shown in FIGS. 11B and 12, when actuation device moving portion 408b retracts, as indicated by arrow 408c, lower plate 504, which is coupled to mounting device 502, rotates, indicated by arrows 702, relative to the mounting device 502 about lower plate axis 502a to an engaging position. Upper plate 506 may be configured to have an upper plate rotational motion and rotate (also indicated by arrows 702) responsive to the rotation of the lower plate 504.

Upper plate 506 may also have an engaging motion in a substantially linear direction 704 different from the non-engaging substantially linear direction 514 (shown in FIG. 11A). Responsive to the rotation of the lower plate 504, the sieve is controlled to move diagonal 704 to the fore-aft direction in the substantially linear direction 704 of the upper plate engaging motion. For example, responsive to the rotation of the lower plate 504, the fixed bar 508 is configured such that the sieve 402 moves diagonal 704 to the fore-aft direction. That is, the sieve 402 also moves in the substantially linear direction 704 of the upper plate engaging motion when the upper plate 506 is rotated to an engaging position. Further, as was the case in the non-engaging position, the sieve 402 moves in the corresponding substantially linear direction of the upper plate motion when the upper plate 506 is in its respective position. That is, when the upper plate 506 is rotated to an engaging position, the sieve 402 moves in the substantially linear direction 704 of the upper plate motion which is substantially parallel to the line B-C extending between the first upper plate pivot portion 506a and the second upper plate pivot portion 506b. Accordingly, a side-to-side component is added to the fore-aft component to move the sieve 402 diagonal 704 to the fore-aft direction in the substantially linear direction 704 of the upper plate engaging motion. In the embodiments described herein, substantially linear may be indicated by the sieve's deviation from center as a function of the sieve's fore-aft movement.

As described above, the side-shaking control systems may include side-shaking assemblies having different linkage configurations for converting rotational motion to approximate straight-line motion. FIG. 13 is a perspective view of a side-shaking assembly 800 illustrating a Watt's linkage that can be used with embodiments of the present invention. As shown in FIG. 13, side-shaking assembly 800 includes a lower plate 804 and an upper plate 806 coupled to the lower plate 804. Lower plate 804 may be rotatably coupled to a mounting device, such as mounting device 502 (shown in FIG. 10B), which is rigidly attached to a vehicle chassis. Side-shaking assembly 800 also includes a first pivot arm 810 coupled to lower plate 804 at a first lower plate pivot portion 804a and coupled to upper plate 806 at a first upper plate pivot portion 806a. Side-shaking assembly 800 also includes a second pivot arm 812 coupled to the lower plate 804 at a second lower plate pivot portion 804b spaced from the first lower plate pivot portion 804a and coupled to the upper plate 806 at a second upper plate pivot portion 806b spaced from the first upper plate pivot portion 806a. Side-shaking assembly 800 further includes a fixed arm 808 rotatably coupled to the upper plate 806 and rigidly attached to the sieve 402. Fixed arm 808 may also include a fixed arm mounting portion, such as fixed arm mounting portion 508a for rigidly attaching fixed arm 808 to the sieve 402. The fixed arm 808 and fixed arm mounting portion 508a may be separate components that are not included as part of the side-shaking assembly 406. It should be appreciated that the described mechanisms shown in FIGS. 9-13 are only examples of the types of mechanisms that can be used to allow the grain pan 44, upper sieve 48, lower sieve 50, and/or return pan 140 to shake in both the fore-to-aft and lateral directions, and that any suitable mechanism to impart such shaking is contemplated as being used according to the present invention.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester, comprising:
    a chassis;
    a threshing and separating system carried by said chassis and including at least one threshing rotor mounted in a longitudinal direction of said agricultural harvester;
    a grain pan carried by said chassis that receives crop material from said threshing and separating system, said grain pan being configured to shake in a fore-to-aft direction and a lateral direction;

a cleaning system carried by said chassis supplied with crop material from said grain pan, said cleaning system including at least one sieve configured to shake in the fore-to-aft direction and the lateral direction out of phase with said grain pan;

a vibration sensor carried by said chassis and configured to detect vibrations; and a controller carried by said chassis and coupled to said vibration sensor, said controller being configured to:
control a shake profile of at least one of said grain pan and said at least one sieve such that said at least one sieve laterally shakes in an opposite direction relative to said grain pan;
receive an output signal from said vibration sensor; and
adjust said shake profile of at least one of said grain pan and said at least one sieve to reduce vibrations in said agricultural harvester responsively to receiving said output signal.

2. The agricultural harvester according to claim 1, wherein said cleaning system includes an upper sieve and a lower sieve both configured to shake in the lateral direction.

3. The agricultural harvester according to claim 2, wherein said upper sieve is configured to shake in the lateral direction in phase with said grain pan.

4. The agricultural harvester according to claim 3, wherein said lower sieve is configured to shake in the lateral direction at least 91 degrees out of phase with at least one of said grain pan and said upper sieve.

5. The agricultural harvester according to claim 4, wherein said lower sieve is configured to shake in the lateral direction 91 to 269 degrees out of phase with at least one of said grain pan and said upper sieve.

6. The agricultural harvester according to claim 2, further comprising a return pan configured to shake in the fore-to-aft direction and the lateral direction.

7. A method of controlling crop material transport through an agricultural harvester having a chassis, comprising:
shaking a grain pan carried by said chassis in a fore-to-aft direction to convey crop material toward a cleaning system carried by said chassis;
controlling shaking of said grain pan by a controller carried by said chassis;
shaking said grain pan in a lateral direction;
shaking at least one sieve of said cleaning system in the lateral direction out of phase with said grain pan;
detecting a machine vibration in said agricultural harvester; and
initiating offsetting lateral shaking to reduce vibrations in said agricultural harvester in response to said detected machine vibration,
wherein said detecting is performed by a vibration sensor coupled to said controller, and
wherein said initiating is performed by said controller.

8. The method according to claim 7, further comprising:
sensing a condition of at least one of said grain pan and said at least one sieve using a sensor coupled to said controller, said sensor sending an output signal to said controller in response to sensing said condition; and
adjusting a shake profile of at least one of said grain pan and said at least one sieve in response to said output signal.

9. The method according to claim 8, wherein said condition is at least one of an uneven distribution of crop material on said grain pan, said agricultural harvester travelling on a side slope, and a non-optimum distribution of crop material on said grain pan.

10. The method according to claim 8, wherein said sensor is at least one of a tilt sensor, an optical sensor, and a load sensor.

11. The method according to claim 7, further comprising programming a shake profile into said controller, said controller causing at least one of said grain pan and at least one sieve to shake in both said fore-to-aft direction and said lateral direction according to said shake profile.

12. The method according claim 7, wherein said cleaning system includes an upper sieve and a lower sieve.

13. The method according to claim 12, wherein said shaking said at least one sieve includes shaking said upper sieve in the lateral direction in phase with said grain pan.

14. The method according to claim 12, wherein said shaking said at least one sieve includes shaking said lower sieve in the lateral direction at least 91 degrees out of phase with said grain pan.

15. The method according to claim 12, wherein said shaking at least one sieve includes shaking said upper sieve in the lateral direction in phase with said grain pan and shaking said lower sieve in the lateral direction 91 to 269 degrees out of phase with said grain pan.

16. The method according to claim 7, further comprising shaking a return pan in both the fore-to-aft direction and the lateral direction.

* * * * *